United States Patent [19]
Bando

[11] Patent Number: 5,265,565
[45] Date of Patent: Nov. 30, 1993

[54] RECIPROCATING ENGINE
[75] Inventor: Shigeru Bando, Tokushima, Japan
[73] Assignee: Bando Kiko Co., Ltd., Tokushima, Japan
[21] Appl. No.: 838,710
[22] PCT Filed: Aug. 1, 1991
[86] PCT No.: PCT/JP91/01028
  § 371 Date: Mar. 13, 1992
  § 102(e) Date: Mar. 13, 1992
[87] PCT Pub. No.: WO92/02722
  PCT Pub. Date: Feb. 20, 1992

[30] Foreign Application Priority Data
  Aug. 3, 1990 [JP] Japan .................. 2-207248

[51] Int. Cl.$^5$ .................. F02F 3/00; F16J 1/02
[52] U.S. Cl. .................. 123/193.4; 123/54 R; 92/85 R; 92/182
[58] Field of Search .................. 123/193.4, 193.6, 193.2, 123/193.1, 54 R, 78 BA, 48 B, 47 R; 92/85 R, 143, 181, 182, 185, 238; 277/27

[56] References Cited
U.S. PATENT DOCUMENTS

| 4,455,974 | 6/1984 | Shapiro et al. ............ 123/47 R |
| 4,681,326 | 7/1987 | Kubo ....................... 277/27 |
| 4,719,846 | 1/1988 | Langstroth ................ 92/127 |
| 4,721,073 | 1/1988 | Naruoka ................... 123/78 BA |
| 4,846,051 | 7/1989 | Wade et al. ............... 123/193.4 |
| 4,864,975 | 9/1989 | Hasegawa ................. 123/78 BA |
| 4,945,866 | 8/1990 | Chabot ..................... 123/54 R |
| 5,050,485 | 9/1991 | Hoult ....................... 123/193.6 |
| 5,054,375 | 10/1991 | Kawabata et al. ........ 123/193.6 |

FOREIGN PATENT DOCUMENTS

| 55-149542 | 10/1980 | Japan . |
| 59-139554 | 9/1984 | Japan . |
| 60-21543 | 2/1985 | Japan . |
| 60-162227 | 10/1985 | Japan . |
| 1417855 | 12/1975 | United Kingdom . |
| 2104621A | 3/1983 | United Kingdom . |

Primary Examiner—Tony M. Argenbright
Assistant Examiner—M. Macy
Attorney, Agent, or Firm—Nixon & Vanderhye

[57] ABSTRACT

An engine (40) comprising a piston (2); a top ring (3) and a second ring (4) attached to the piston (2); partitioning members (9)(10) attached to the piston (2) and connecting the top ring (3) and the second ring (4) so as to form a gas chamber (8) at the side surface of the piston (2); a gas passage (15) for communicating the gas chamber (8) to an upper surface (7) of the piston.

34 Claims, 10 Drawing Sheets

RECIPROCATING ENGINE

FIELD OF THE ART

The present invention relates to reciprocating engines such as gasoline engines or diesel engines.

BACKGROUND ART

In reciprocating engines, a technique for bringing rollers provided on a skirt portion of the piston into rolling contact with the inner surface of the side wall of the cylinder is proposed in order to decrease the sliding frictional resistance between the inner surface of the side wall of the cylinder and the side surface of the piston through piston rings and the like in the reciprocation of the piston.

According to the technique for involving such rollers, the weight of the piston increases and the inertia of the piston during reciprocation increases. As a result, the responsiveness of the engine is reduced. For example, driving performance such as acceleration performance is deteriorated, and hence driving becomes difficult.

In view of the above, it is an object of the present invention to provide an engine for decreasing the frictional resistance in the piston reciprocation by floating the lateral-pressure receiving side of the piston from the inner surface of the side wall of the cylinder by using a gas chamber which is provided between the side surface of the piston and the inner surface of the side wall of the cylinder without increasing the weight of the piston.

The other object of the present invention is to provide an engine with a simple structure and high durability by floating the lateral pressure receiving side of the piston from the inner surface of the side wall of the cylinder by using the gas pressure of a gas chamber into which the gas pressure is introduced from the combustion chamber, the gas chamber being formed between the inner surface of the side wall of the cylinder and the side surface of the piston opposite to the inner surface of the side wall of the cylinder.

DISCLOSURE OF THE INVENTION

According to the present invention, there is provided an engine comprising a piston, a top ring and a second ring which are fitted on the piston, a partition member fitted on the piston and connecting the top ring and the second ring for forming a gas chamber at the side surface of the piston, and a gas passage for communicating the gas chamber to an upper surface of the piston.

In one embodiment of the present invention, the gas passage is a gap between opposite ends of the top ring. In another embodiment, the gas passage is a through hole formed in the piston.

According to the present invention, there is provided an engine comprising a first and a second piston rings provided on a piston, and a gas passage formed at the position of the fisrt piston ring for adjusting a gas flow, the first piston ring being disposed adjacent to an upper surface of the piston that defines an engine combustion chamber, the gas passage communicating between the engine combustion chamber and an annular gas chamber defined between the side surface of the piston and the inner suface of the side wall of the cylinder opposite to the side surface of the piston as well as between the first piston ring and the second piston ring, the second piston ring being disposed adjacent to the first piston ring, the first and second piston rings being so provided on the piston that the distance between the first and second piston rings increases gradually from one of oscillating side surfaces of the piston to the other oscillating side surface opposite to the one oscillating side surface.

According to the present invention, there is provided an engine comprising a first and a second piston ring provided on a piston, and a gas passage formed at the position of the first piston ring for adjusting a gas flow, the first piston ring being disposed adjacent to an upper surface of the piston that defines an engine combustion chamber, the gas passage communicating between the engine combustion chamber and an annular gas chamber defined between the side surface of the piston and the inner surface of the side wall of the cylinder opposite to the side surface of the piston as well as between the first piston ring and a second piston ring, the second piston ring being disposed adjacent to the first piston ring, the first and second piston rings being so provided on the piston that the area of the piston side surface which receives the gas pressure in the annular gas chamber increases from one of oscillating side surfaces of the piston to the other oscillating side surface opposite to the one oscillating side surface.

In one preferred embodiment of the present engine, the first piston ring is disposed on the side surface of the piston substantially parallel to the upper surface of the piston which defines the engine combustion chamber, and the second piston ring is disposed on the side surface of the piston and tilted to the first piston ring.

The gas passage in the present engine may be a gap between spaced opposite ends of the first piston ring. Alternatively, the gas passage may be a concavity or a through hole provided in the first piston ring. Alternatively, the gas passage may be a combination of such gap, concavity and through hole. In summary, the gas passage is formed at the position of the first piston ring such that the annular gas chamber and the engine combustion chamber are communicated to each other.

The opposite ends of the second piston ring in the present engine preferably closely contact or fit to each other such that no gas in the gas chamber leaks out through a possible space between the opposite ends of the second piston ring. More preferably, a third piston ring is provided on the piston so as to prevent a possible leakage of the gas from the space between opposite ends of the second piston ring.

In a preferred embodiment of the present invention, one of the oscillating side surfaces of the piston is an opposite-to-thrust side surface of the piston and the other of the oscillating side surfaces is a thrust side surface of the piston.

According to the present invention, there is provided an engine comprising a biased space into which the gas pressure from the engine combustion chamber is introduced, the biased space being formed between the inner surface of the side wall of a cylinder and the side surface of the piston opposite to the inner surface of the side wall of the cylinder such that the area of the side surface of the piston which receives the gas pressure is larger at the side surface of the piston on the thrust side opposite to the side surface on the opposite-to-thrust side than at the side surface of the piston on the opposite-to-thrust side, and a piston pin for connecting a connecting rod to the piston, the pin being provided on the piston such that the center of the pin is displaced from the center of the piston toward the opposite-to-thrust side.

According to the present invention, there is provided an engine comprising a piston ring provided at the side surface of the piston adjacent to an upper surface of the piston such that the distance from the upper surface of the piston, which defines the engine combustion chamber, to the piston ring increases gradually from the side surface of the piston on the opposite-to-thrust side toward the side surface of the piston on the thrust side opposite to the side surface of the piston on the opposite-to-thrust side, and a piston pin for connecting a connecting rod to the piston, the pin being provided on the piston such that the center of the pin is displaced from the center of the piston toward the opposite-to-thrust side.

According to the present invention, there is provided an engine comprising a piston ring provided at the side surface of a piston such that the area of the side surface of the piston which receives the gas pressure from the engine combustion chamber is larger at the side surface of the piston on the thrust side opposite to the side surface of the piston on the opposite-to-thrust side than at the side surface of the piston on the opposite-to-thrust side, and a piston pin for connecting a connecting rod to the piston, the pin being provided at the piston such that the center of the pin is displaced from the center of the piston toward the opposite-to-thrust side.

In one embodiment of the engine according to the present invention, the piston ring is provided on the side surface of the piston and tilted to the upper surface of the piston. In another embodiment, a second piston ring is provided adjacent and parallel to the first-mentioned piston ring on the side surface of the piston. In a further embodiment, a second piston ring is provided adjacent to the first-mentioned piston ring and parallel to the upper surface of the piston on the side surface of the piston.

According to the preset invention, there is provided an engine comprising a gas passage for communicating between the engine combustion chamber and an annular gas chamber defined between the side surface of the piston and the inner surface of the side wall of the cylinder opposite to the side surface of the piston, and between a first and a second piston rings provided on the piston, the first piston ring being disposed adjacent to the upper surface of the piston which defines the engine combustion chamber and the second piston ring being disposed adjacent to the first piston ring, the first and second piston rings being so provided on the piston that the distance between the first and second piston rings increases gradually from the side surface of the piston on the opposite-to-thrust side toward the side surface of the piston on the thrust side opposite to the side surface of the piston on the opposite-to-thrust side, and a piston pin for connecting the connecting rod to the piston, the pin being provided on the piston such that the center of the pin is displaced from the center of the piston toward the opposite-to-thrust side.

According to the present invention, there is provided an engine comprising a gas chamber, which is communicated to the engine combustion chamber through a gas passage, the gas chamber being provided between the side surface of the piston and the inner surface of the side wall of the cylinder opposite to the side surface of the piston and between a first piston ring disposed adjacent to the upper surface of the piston that defines the engine combustion chamber and a second piston ring disposed adjacent to the first piston ring such that the area of the side surface of the piston which receives the gas pressure is larger at the side surface of the piston on the thrust side opposite to the side surface of the piston on the opposite-to-thrust side than at the side surface of the piston on the opposite-to-thrust side, and a piston pin for connecting a connecting rod to the piston, the pin being provided on the piston such that the center of the pin is displaced from the center of the piston toward the opposite-to-thrust side.

In a preferred embodiment, the first piston ring is disposed on the side surface of the piston substantially parallel to the upper surface of the piston which defines the engine combustion chamber, and the second piston ring is disposed on the outer circumferential surface of the piston and tilted to the first piston ring.

In another embodiment, the first and second piston ring are disposed on the outer circumferential surface of the piston substantially parallel to the upper surface of the piston which defines the engine combustion chamber, and a gas chamber partition member is provided between the first and second piston rings for forming the gas chamber.

In a preferred embodiment of the above engines, the gas passage is a gap between spaced opposite ends of the first piston ring. Alternatively, the gas passage is a through hole or a concavity formed in the piston, the first piston ring or the cylinder.

According to the preset invention, there is provided an engine comprising a piston provided with a first piston ring disposed adjacent to the upper surface of the piston which defines the engine combustion chamber, and the second piston ring disposed adjacent to the first piston ring such that the distance between the first and second piston rings increases gradually from the side surface of the piston on the opposite-to-thrust side toward the side surface of the piston on the thrust side opposite to the side surface of the piston on the opposite-to-thrust side, and a cylinder formed on the inner surface of the side wall thereof with a gas passage for communicating to the engine combustion chamber an annular biased gas chamber defined between the side surface of the piston and the inner surface of the side wall of the cylinder opposite to the side surface of the piston as well as between the first piston ring and the second piston ring, when the piston is at a position substantially in a range from 0 to 20 degrees of crank angle.

According to the present invention, an engine comprising an annular space defined as a biassed gas chamber between the side surface of the piston and the inner surface of the side wall of the cylinder opposite to the side surface of the piston and between a first piston ring disposed adjacent to the upper surface of the piston that defines the engine combustion chamber and a second piston ring disposed adjacent to the first piston ring such that the area of the side surface of the piston that receives the gas pressure in the biased gas chamber is larger at the side surface of the piston on the thrust side opposite to the side surface of the piston on the opposite-to-thrust side than at the side surface of the piston on the opposite-to-thrust side, and a gas passage provided on the inner surface of the side wall of the cylinder for communicating the biased gas chamber to the engine combustion chamber when the piston is at a position substantially in a range from 0 to 20 degrees of crank angle.

Preferably, the first piston ring is disposed on the outer circumferential surface of the piston substantially parallel to the upper surface of the piston that defines the engine combustion chamber, and the second piston ring is disposed on the outer circumferential surface of the piston and tilted to the first piston ring.

In one embodiment of the engine of the present invention, the gas passage is formed on the inner surface of the side wall of the cylinder so as to communicate the biased gas chamber to the engine combustion chamber with a maximum opening when the piston is at a position corresponding substantially to 10 degrees of crank angle. In another embodiment, the gas passage is formed on the inner surface of the side wall of the cylinder so as to close the communication of the biased gas chamber to the engine combustion chamber or to slightly communicate the biased gas chamber to the engine combustion chamber when the piston is at a position corresponding substantially to 0 degree of crank angle.

Preferably, the gas passage in the above engines is formed on the inner surface of the side wall of the cylinder opposite to the side surface of the piston on the thrust side.

In one embodiment, the gas passage is formed on the inner surface of the side wall of the cylinder so as to close the communication between the biased gas chamber and the engine combustion chamber when the piston is at a position substantially more than 20 degrees of crank angle. Particularly, the gas passage is preferably embodied a spherical concavity formed on the inner surface of the side wall of the cylinder.

According to the present invention, there is provided an engine comprising an annular space formed between a first piston ring disposed adjacent to an upper surface of a piston that defines the engine combustion chamber and a second piston ring disposed adjacent to the first piston ring, the annular space being partitioned into a half annular space on the thrust side and a half annular space on the opposite-to-thrust side, a first gas passage formed on the side wall of the cylinder for communicating the half annular space on the thrust side to the engine combustion chamber when the piston is in the vicinity of the top dead center, and a second gas passage for communicating the half annular space on the opposite-to-thrust side to the engine combustion chamber.

In the above engine, preferably, the first gas passage is formed on the inner surface of the side wall of the cylinder so as to communicate the half annular space on the thrust side to the engine combustion chamber when the piston is at a position substantially in a range from 0 to 20 degrees of crank angle, and to communicate the half annular space on the thrust side to the engine combustion chamber with a maximum opening when the piston is at a position of substantial 10 degrees of crank angle.

In the present engine, the first gas passage may be embodied by a spherical concavity formed on the inner surface of the side wall of the cylinder or may be formed in the piston.

In one embodiment, the second gas passage is formed on the first piston ring. In another embodiment, the second gas passage is disposed between opposing ends of the first piston ring.

The present invention will be described hereinafter in more detail with respect to the embodiments thereof shown in the drawings. By this description, the above invention and its advantages as well as other inventions and their advantages will be clarified. It is to be noted that the present invention is not at all limited to these embodiments.

BEST MODE FOR CARRYING OUT THE INVENTION

Figure 1:
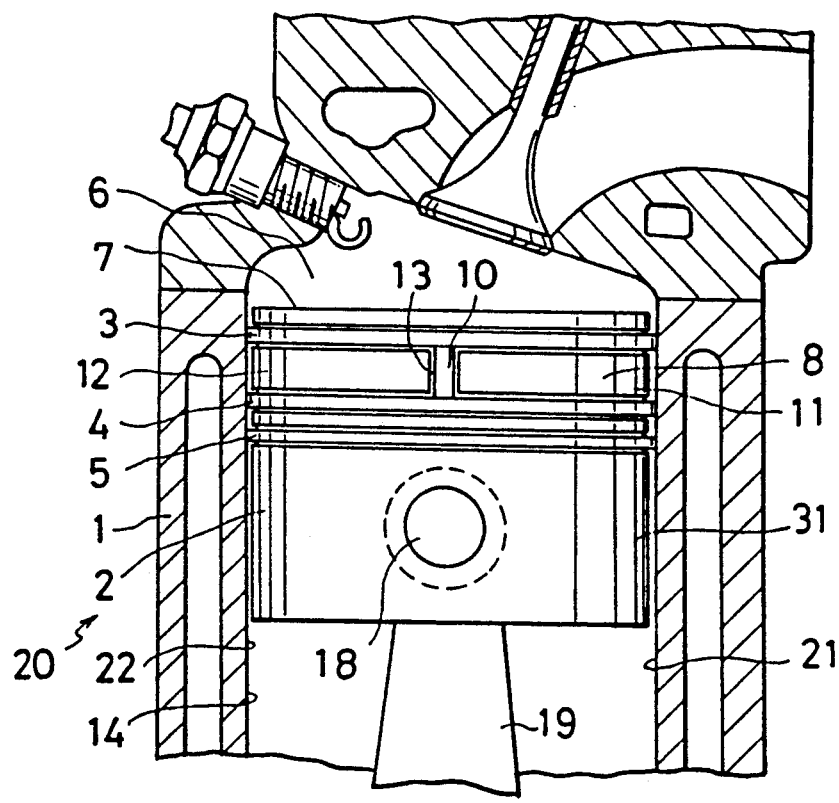
FIG. 1 is a sectional view of a preferred embodiment of the present invention.
Figure 2:
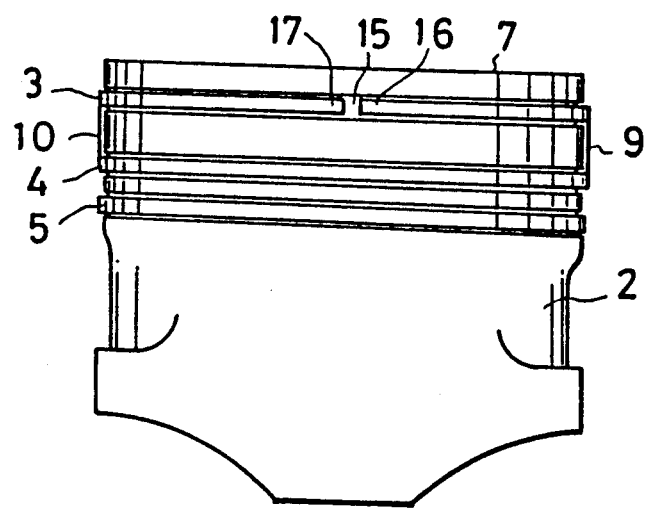
FIG. 2 is a right side view of the piston of the embodiment shown in FIG. 1.
Figure 3:
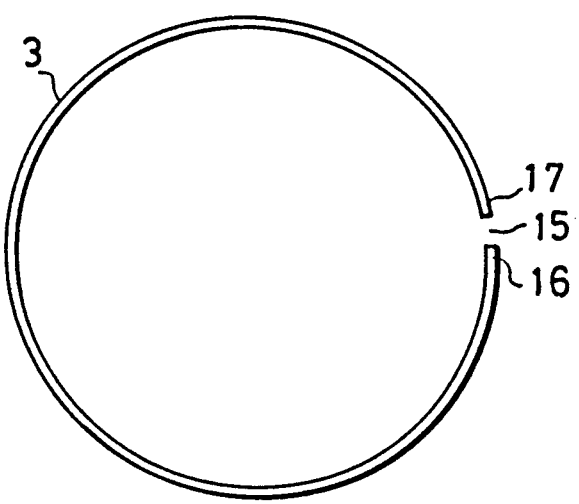
FIG. 3 is a plan view of the piston ring of the embodiment shown in FIG. 1.
Figure 4:
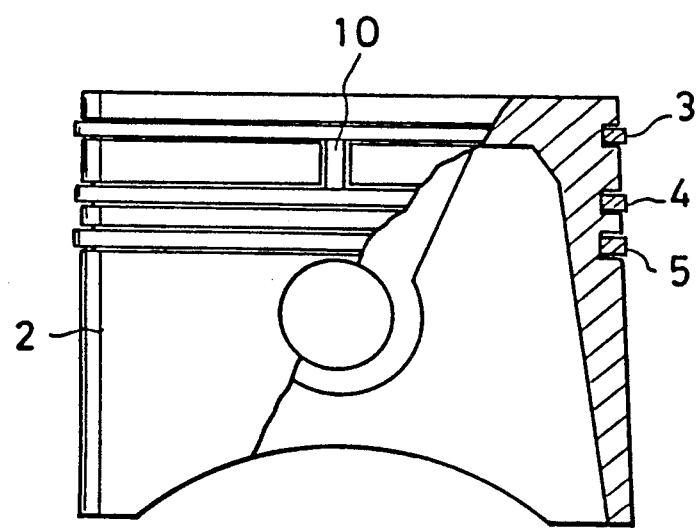
FIG. 4 is a partially sectional view of the piston of the embodiment shown in FIG. 1.

Referring to FIGS. 1 to 4, piston rings 3, 4 and an oil ring 5 are fitted into grooves formed on an upper side surface 31 of a piston 2 disposed in a cylinder 1. The piston rings 3 and 4 are disposed at a wider interval than usual.

An annular space 8 between the piston ring i.e., the top ring 3 disposed adjacent to an upper surface 7 of the piston 2 that defines an engine combustion chamber 6, and the piston ring, i.e., the second ring 4 disposed adjacent to the top ring, is gas-tightly partitioned into a half annular space 11 on the thrust side and a half annular space 12 on the opposite-to-thrust side by partitioning members 9 and 10 disposed between the piston rings 3 and 4. The respective defining members 9 and 10 are provided trough springs in grooves 13 formed on the side surface 13 of the piston 2 and are in contact with the inner surface of the side wall of the cylinder 14 so as to slide freely by the resiliency of the spring. A flow adjusting gas passage 15 which makes the half annular space 11, that is, a gas chamber, communicate to the engine combustion chamber 6 is embodied by a gap formed between opposite ends 16 and 17 of the piston ring 3 spaced wider than usual. Rotation stopping means is provided to the piston ring 3 such that the gas passage 15 always exists at the position where the engine combustion chamber 6 is communicated to the half annular space 11 through the passage 15 during the reciprocation of the piston 2.

A connecting rod 19 is connected to the piston 2 through a piston pin 18.

In the engine 20 thus composed, a compressed gas is introduced into the half annular space 11 through the gas passage 15 from the engine combustion chamber 6 in the compression stroke where the piston 2 is moved upward and the connecting rod 19 is on the thrust side. The compressed gas introduced into the half annular space 11 on the thrust side acts on the piston 2 so as to push the piston 2 back toward the opposite-to-thrust side, i.e., toward the inner surface 22 of the side wall of the cylinder on the opposite-to-thrust side against the lateral pressure from the piston 2 toward the inner surface 21 of the side wall of the cylinder on the thrust side through the piston rings 3, 4 and the oil ring 5. Thus, the lateral pressure from the piston 2 to the inner surface 21 of the side wall of the cylinder on the thrust side through the piston rings 3, 4 and the oil ring 5 developed in the compression stroke is canceled, so that the piston 2 is moved upward in a state where the sliding frictional resistance between the piston and the inner surface 21 of the cylinder on the thrust side is decreased enough.

On the other hand, in the explosion stroke where the piston 2 is moved downward and the connecting rod 19 is on the opposite-to-thrust side, a high pressure combustion gas is introduced into the half annular space 11 through the gas passage 15 with a time lag. The high pressure combustion gas introduced into the half annular space 11 on the thrust side acts on the piston 2 so as to push the piston 2 back toward the opposite-to-thrust side, i.e., toward the inner surface 22 of the side wall of the cylinder on the opposite-to-thrust side against the lateral pressure from the piston 2 to the inner surface 21 of the cylinder on the thrust side through the piston rings 3, 4 and the oil ring 5. As a result, the lateral pressure from the piston 2 toward the inner surface 21 of the cylinder on the thrust side through the piston rings 3,4 and the oil ring 5 developed in the explosion stroke is canceled, so that the piston 2 is moved downward in a state where the sliding frictional resistance between the piston 2 and the inner surface 21 of the cylinder on the thrust side is decreased enough.

As described above, in the engine 20 of the present embodiment, the piston 2 is supported in a state where the lateral pressure receiving side of the piston 2 is floated from the inner surface 14 of the side wall of the cylinder, especially from the inner surface 21 of the side wall of the cylinder on the thrust side by the gas pressure introduced into the half annular space 11 that is the gas chamber. In such gas-floated state, the piston 2 is moved in the cylinder 1. Therefore, the piston 2 is reciprocated very lightly because the frictional resistance of piston 2 to the inner surface 14 of the cylinder through the piston ring 3 and the like is low as well as rollers and the like are not installed on the piston 2.

The piston 2 is moved parallel to the inner surface 14 of the cylinder in the state always pushed to one side by the gas pressure introduced into the gas chamber, and hence the heating caused by a tilt of the piston or the like, and a collision of the piston with the inner surface 14 of the cylinder and the like are prevented. Therefore, collision noise which would otherwise be caused in conventional diesel engines will be greatly reduced. The lateral pressure of the piston is low since a tilt of the piston is difficult to occur. The frictional resistance of the piston to the inner surface 14 of the cylinder is low since the piston is in the gas-floated state even if the piston receives the lateral pressure, and as a result, the driving responsiveness of the engine is high.

Figure 5:
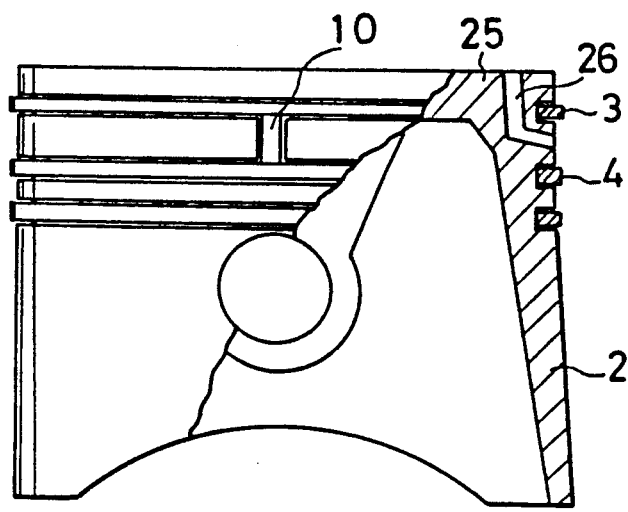
FIG. 5 is a partially sectional view of the piston of another preferred embodiment of the present invention.

While in the engine 20, the gas passage 15 is embodied by the gap between the opposite ends of the piston ring 3, arrangement may be such that a through hole 26 to communicate the engine combustion chamber 6 to the half annular space 11 is formed in the body 25 of the piston 2, so that the gas pressure of the engine combustion chamber 6 is introduced into the half annular space 11 through the hole 26 as shown in FIG. 5.

Another preferred embodiment of the present invention will be described hereinafter with respect to the FIG. 6.

Figure 6:
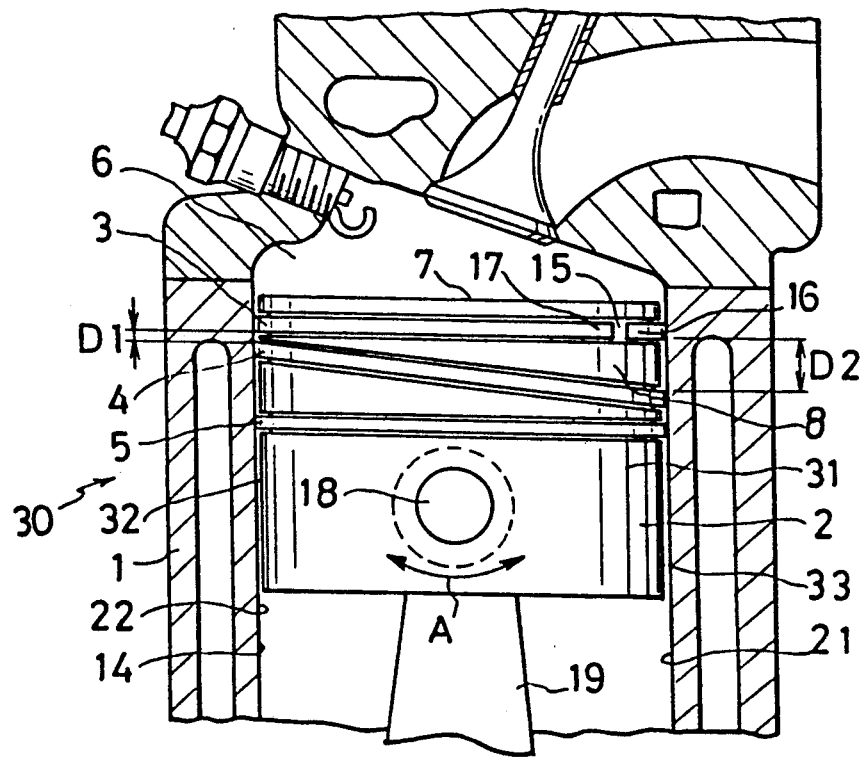
FIG. 6 is a sectional view of a further preferred embodiment of the present invention.

Referring to FIG. 6, the piston rings 3 and 4 as well as the oil ring 5 are fitted to the upper portion of the piston 2 disposed in the cylinder 1 also in an engine 30 of the present embodiment. The opposite ends 16 and 17 of the piston ring 3 provided on the outer circumferential surface of the piston 2 substantially parallel to an upper surface 7 of the piston 2 that defines the engine combustion chamber 6 are spaced to form a flow adjusting gas passage 15 in the same way as described above. The gas passage 15 communicates the annular space 8 between the piston ring 3 and the piston ring 4 disposed adjacent to the piston ring 3 to the engine combustion chamber 6. In the present embodiment, the overall annular space 8 is the gas chamber.

The piston ring 4 is so disposed on the side surface 31 of the piston 2 and tilted to the piston ring 3 that the distance between the piston rings 3 and 4 lengthens gradually from the piston side surface 32 on the opposite-to-thrust side that is one of the oscillating side surfaces of the piston 2 toward the piston side surface 33 on the thrust side that is the other one of the oscillating side surfaces opposite to the side surface 32, in other words, that the distance D2 is longer than the distance of D1. Thus, the pressure receiving area of the side surface 31 of the piston 2 which receives the gas pressure in the annular space 8 is larger on the side surface 33 of the piston on the thrust side than on the side surface 32 of the piston on the opposite-to-thrust side.

In the engine 30 thus composed, the gas pressure generated by explosion in the combustion chamber 6 in the explosion stroke is adjusted in flow through the gas passage 15, and as a result, introduced into the annular space 8 with a time lag compared to the generation of the gas pressure in the combustion chamber 6. The piston 2 including the piston ring 3 and the like receives the biased lateral pressure in the annular space 8 to be put into the state floated from the inner surface 14 of the side wall of the cylinder, especially from the inner surface 21 of the side wall of the cylinder on the thrust side in the reciprocation. The piston 2 floated by the gas pressure from the inner surface 21 of the cylinder is reciprocated with extremely low frictional resistance, and, an oscillation of the piston 2 in the direction A around the piston pin 18 in the reciprocation is prevented by the biased gas pressure in the annular space 8 described above. As a result, the piston 2 is capable of reciprocating without the side surface 31 of the piston 2 on the thrust side, i.e., the side surface 33 of the piston abutting on the inner surface 21 of the side wall of the cylinder 1 on the thrust side, as well as is capable of reciprocating with extremely low frictional resistance in addition to the above, and consequently, the fuel economy of the engine is improved.

Still another embodiment of the present invention will be described hereinafter with respect to FIGS. 7 and 8.

Figure 7:
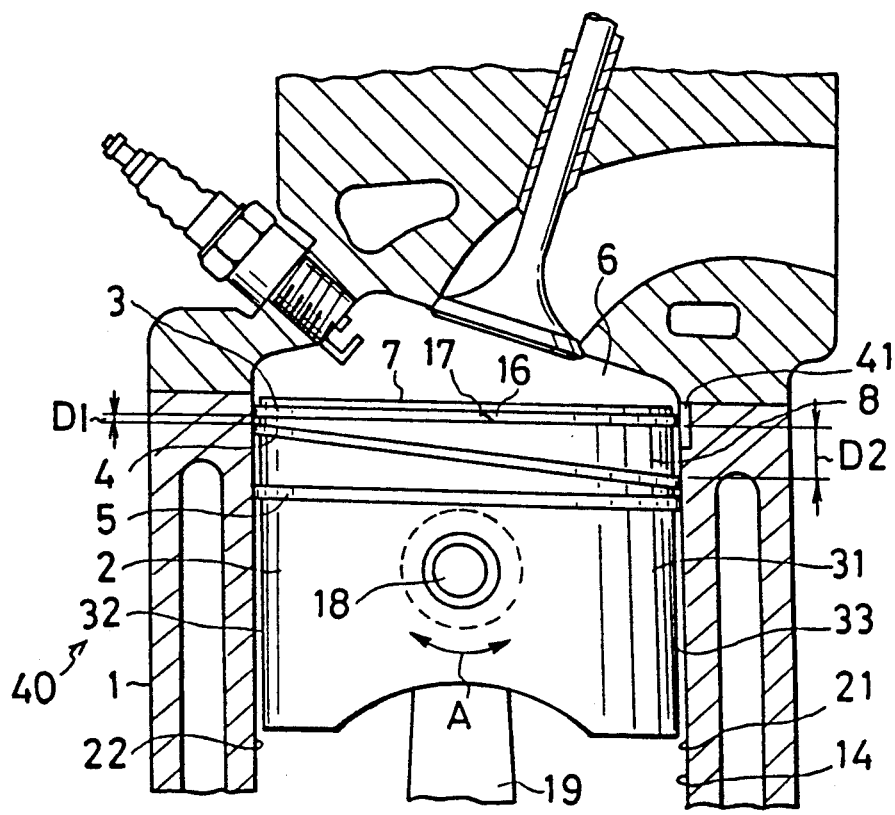
FIG. 7 is a sectional view of a fourth preferred embodiment of the present invention.
Figure 8:
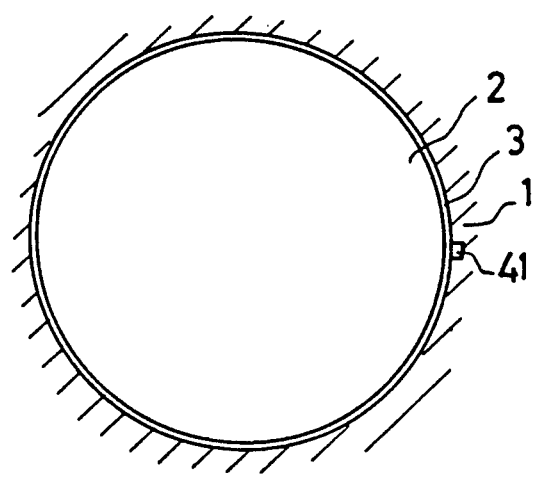
FIG. 8 is a sectional plan view of the embodiment shown in FIG. 7.

Referring to FIGS. 7 and 8, in a engine 40 of the present embodiment both opposite ends 16 and 17 of the piston ring 3 are fitted closely to each other without forming such as a gas passage 15 therebetween so that the gas introduced into the biased annular space 8 will not leak.

Also in this embodiment, the piston ring 4 is so disposed on the side surface 31 of the piston 2 and tilted to the piston ring 3 that the distance between the piston rings 3 and 4 increases gradually from the side surface 32 of the piston 2 on the opposite-to-thrust side toward the side surface 33 on the thrust side opposite to the side surface 32 on the opposite-to-thrust side, in other words, that the distance D2 is greater than the distance D1. In the engine 40 of the present embodiment, a concavity 41 as the gas passage that communicates the annular space 8 as the biased gas chamber to the engine combustion chamber 6 is formed on the inner surface 21 of the side wall of the cylinder facing the side surface 33 of the piston 2 on the thrust side when the piston 2 is a position substantially in a range from 0 to 20 degrees of crank angle.

In the engine 40 thus composed, the gas pressure generated by explosion in the engine combustion chamber 6 in the explosion stroke is introduced into the annular space 8 through the concavity 41. In the reciprocation, the piston 2 is floated from the inner surface 14 of the cylinder, particularly from the inner surface 21 of the cylinder facing the side surface 33 of the piston on the thrust side, by receiving the biased lateral pressure in the annular space 8 on the basis of the introduced gas pressure. The piston 2 floated from the inner surface 21 of the cylinder by the gas pressure is reciprocated with extremely low sliding frictional resistance, and as a result, the fuel economy of the engine is improved.

When the piston 2 is moved to a position of almost more than 20 degrees of crank angle, the annular space 8 and the engine combustion chamber 6 are not communicated to each other. Thus, the gas pressure introduced into the annular space 8 through the concavity 41 by explosion in the engine combustion chamber 6 when the piston 2 is a position in a range of almost from 0 to 20 degrees of crank angle will be maintained as it is even if the piston 2 is moved to a position of more than 20 degrees of crank angle. Consequently, the piston 2 is reciprocated with sufficiently reduced sliding frictional resistance to the inner surface 14 of the cylinder 1 also, while it is moving at a position of almost more than 20 degrees of crank angle.

Although the gas passage embodied by the concavity 41 may be disposed at any place in the inner surface 14 of the cylinder with respect to the circumferential direction thereof, it is preferable that it is disposed on the inner surface 21 of the cylinder facing to the thrust side of the piston 2 as in the present embodiment. Moreover, while the gas passage is embodied by the concavity 41 in the engine 40, it may be embodied instead by a through hole provided in the inner surface 14 of the cylinder. The number of such concavities or through holes as the gas passage may be one. Alternatively, more than one concavity or hole may be provided in the inner surface 14 of the cylinder at positions shifted to each other with respect to the circumferential direction and in the direction of reciprocation of the piston 2 or at the same position.

Figure 9:
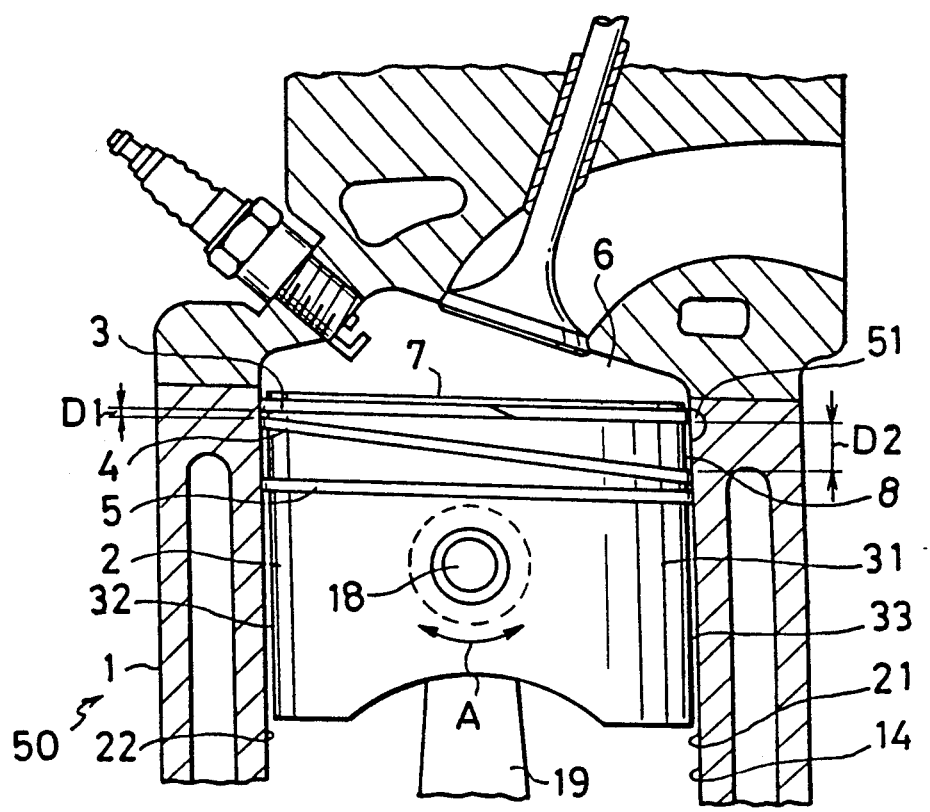
FIG. 9 is a sectional view of a fifth preferred embodiment of the present invention.
Figure 10:
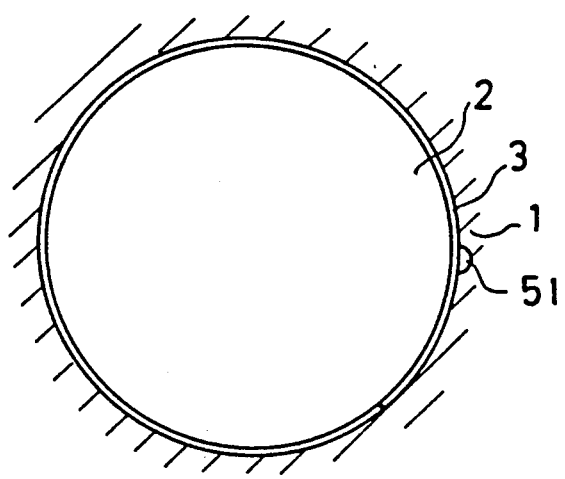
FIG. 10 is a sectional plan view of the embodiment shown in FIG. 7.

The concavity 41 may be a hemispherical one 51 as shown in FIGS. 9 and 10. An engine 50 thus composed not only operates in the same manner as the engine 40 but also is capable of decreasing a probability that the gas passage will be stopped up with carbon residues deposited thereon because the gas passage which communicates the annular space 8, that is, the gas chamber, to the engine combustion chamber 6 is the hemispherical concavity 51 formed on the inner surface 14 of the cylinder.

Yet another embodiment of the present invention will be described with respect to the FIG. 11.

Figure 11:
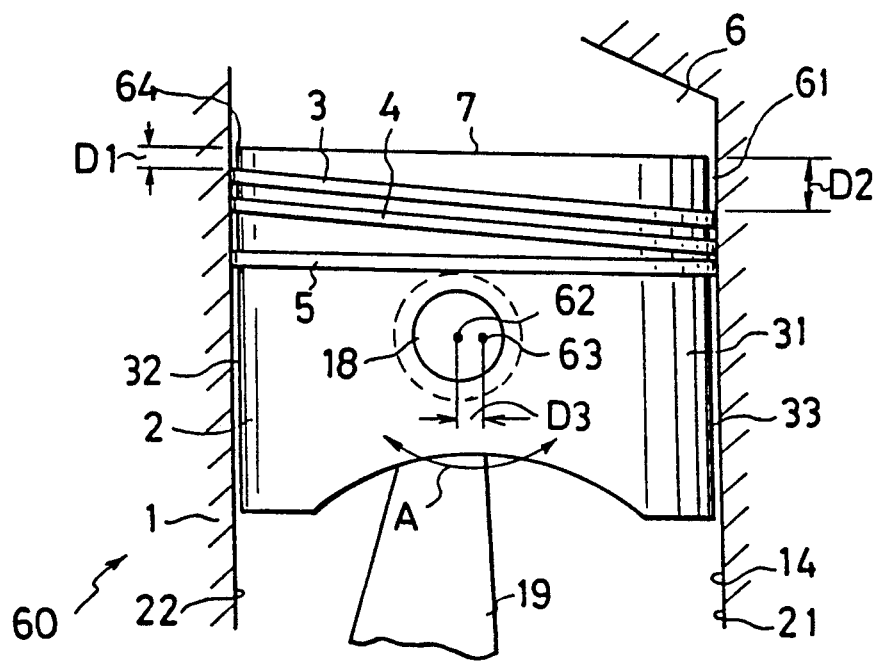
FIG. 11 is a sectional view of a sixth preferred embodiment of the present invention.

Referring to FIG. 11, in an engine 60 of the present embodiment the piston ring 3 disposed adjacent to the upper surface 7 of the piston 2 that defines the engine combustion chamber 6 is so provided on the side surface 31 of the piston 2 and tilted to the upper surface 7 of the piston 2 that the distance of the ring 3 from the upper surface 7 of the piston 2 increases gradually from a side surface 32 of the piston 2 on the opposite-to-thrust side toward the side surface 33 of the piston on the thrust side opposite to the side surface 32 of the piston on the opposite-to-thrust side, in other words, that the distance D2 is greater than the distance D1. Thus, in the present embodiment, an annular space 61 positioned between the side surface 31 of the piston 2 and the inner surface 14 of the cylinder 1 and between the upper surface 7 of the piston 2 that defines the engine combustion chamber 6 and the piston ring 3 adjacent to the engine combustion chamber is formed as the biased space.

The piston ring 4 adjacent to the piston ring 3 is disposed on the side surface 31 of the piston 2 parallel to the piston ring 3 and tilted to the upper surface 7 of the piston 2 in the present embodiment.

The piston pin 18 is so attached to the piston 2 that the center 62 thereof is displaced by the distance D3 from the center 63 of the piston 2 toward the side surface 32 of the piston on the opposite-to-thrust. As a result, the connecting rod 19 is oscillated in the direction A around the center 62 in the reciprocation of the piston 2.

In the engine 60 thus composed, the gas pressure generated by explosion in the engine combustion chamber 6 in the explosion stroke is also introduced into the annular biased space 61, which is the annular gas chamber. The piston 2 is floated from the inner surface 14 of the cylinder, especially the inner surface 21 of the cylinder on the thrust side in the reciprocation by receiving the biased lateral pressure in the space 61 on the basis of the introduced gas pressure. The piston 2 floated from the inner surface 21 of the cylinder by the gas pressure is reciprocated with extremely low frictional resistance, and as a result, the fuel economy of the engine is improved.

The piston 2 receiving the biased lateral gas pressure in the space 61 at the upper portion thereof receives a counterclockwise rotation (oscillating) moment in FIG. 11. In the engine 60, wherein the piston pin 18 is attached to the piston 2 with its center 62 displaced by the distance D3 from the center 63 of the piston 2 toward the side surface 32 of the piston on the opposite-to-thrust side, the clockwise rotation moment based on the reactive force acting on the connecting rod 19 in the direction opposite to the counterclockwise rotation (oscillating) moment in FIG. 11 is large as compared with the engine wherein the piston pin 18 is attached to the piston 2 with its center not displaced from the center 63 of the piston 2, in other words, with its center coinciding with to the center 63 of the piston 2. Thus, the counterclockwise rotation (oscillating) moment based on the biased lateral gas pressure in the space 61 is canceled positively, and hence the top 64 of the side surface 32 of the piston is prevented positively from abutting on the inner surface 14 of the cylinder. As a result, an undesirable situation such as galling is avoided.

Figure 12:
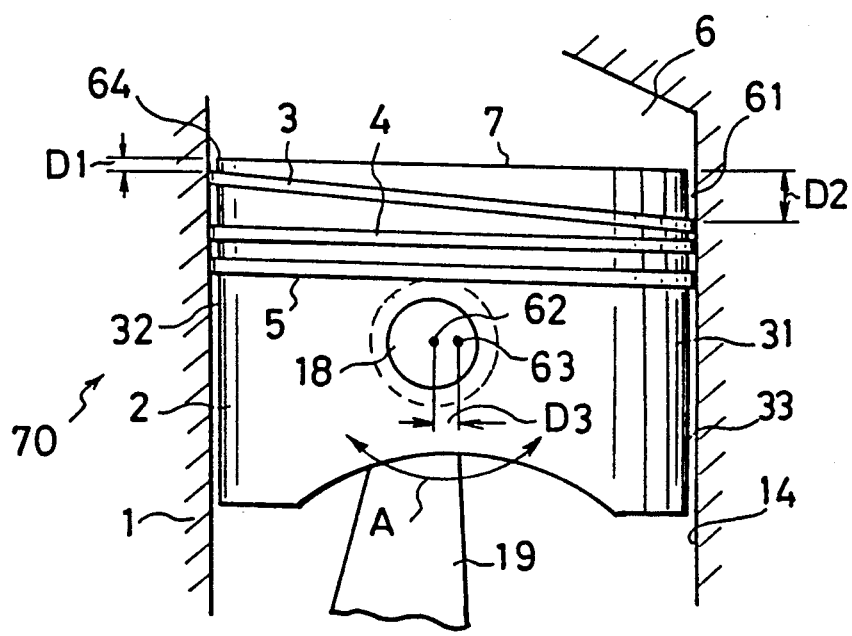
FIG. 12 is a sectional view of a seventh preferred embodiment of the present invention.

While in the engine 60 described above the piston ring 4 is disposed on the side surface 31 of the piston 2 parallel to the piston ring 3 and tilted to the upper surface 7 of the piston 2, an engine 70 as shown in FIG. 12 may be so formed that the piston ring 4 is provided parallel to the upper surface 7 of the piston 2 like the oil ring 5 on the side surface 31 of the piston 2.

Figure 13:
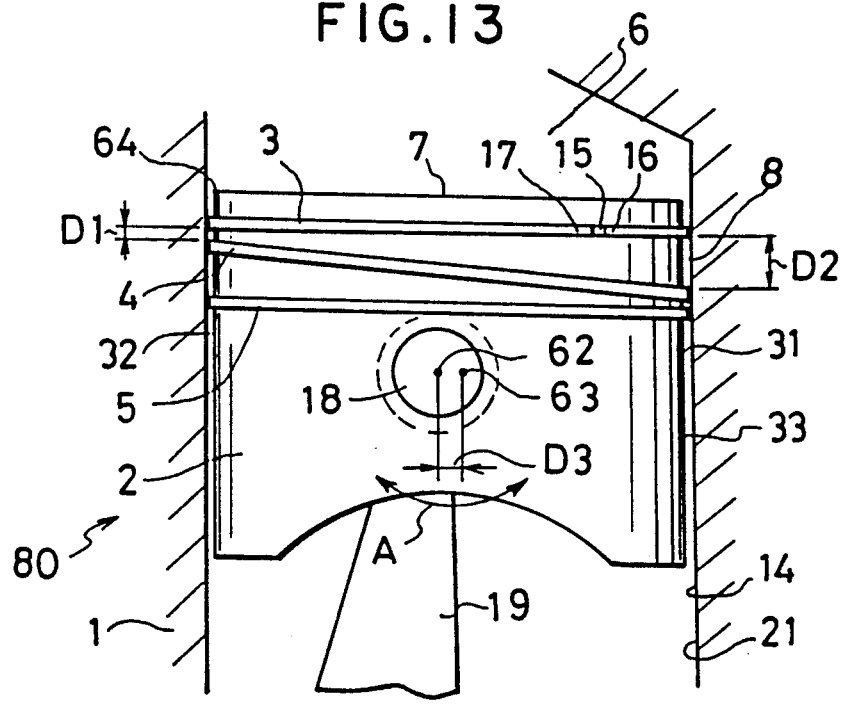
FIG. 13 is a sectional view of an eighth preferred embodiment of the present invention.

As shown in FIG. 13, and like the engine 30 shown in FIG. 6, an engine 80 may be so formed that the piston ring 4 is disposed on the side surface 31 of the piston 2 and tilted to the piston ring 3 such that the distance between the piston rings 3 and 4 increases gradually from the side surface 32 of the piston 2 on the opposite-to-thrust toward the side surface 33 of the piston on the thrust side opposite to the side surface 32 of the piston 2 on opposite-to-thrust, in other words, such that the distance D2 is greater than the distance D1, and hence the biased space 8, that is, the annular gas chamber, is formed such that the area of the side surface 31 of the piston 2 that receives the gas pressure is larger at the side surface 33 of the piston on the thrust side than at the side surface 32 of the piston on the opposite-to-thrust side, that a gas passage 15 is embodied by a gap between the spaced opposite ends of the piston ring 3 disposed at the side surface 31 of the piston 2 substantially parallel to the upper surface 7 of the piston 2 that defines the engine combustion chamber 6 in order to introduce the gas into the biased annular space 8 through the gas passage 15, and that a piston pin 18 is attached to the piston 2 such that a center 62 is displaced by a distance D3 from the center 63 of the piston 2 toward the side surface 32 of the piston on the opposite-to-thrust side.

The gas pressure generated by explosion in the engine combustion chamber 6 in the explosion stroke is introduced into the biased space 8 through the gas passage 15 also in the engine 80 shown in FIG. 13. The piston 2 is floated from the inner surface 14 of the cylinder, especially from the inner surface 21 of the cylinder on the thrust side by receiving the biased lateral pressure in the biased space 8 in its reciprocation. Also, in the engine 80 of the present embodiment wherein the piston 2 floated from the inner surface 21 of the cylinder by the gas pressure is reciprocated with extremely low sliding frictional resistance, and the piston pin 18 is so attached to the piston 2 that the center 62 thereof is displaced by the distance D3 from the center 63 of the piston 2 toward the side surface 32 of the piston on the opposite-to-thrust side, the clockwise rotation (oscillating) moment is greater than the counterclockwise rotation (oscillating) moment opposite to the clockwise rotation moment in FIG. 13, as compared with the engine wherein the piston pin 18 is attached to the piston 2 with the center thereof coinciding with the center 63 of the piston 2. Thus, the counterclockwise rotation (oscillating) moment based on the biased lateral gas pressure in the space 8 is canceled positively, as well as the piston top 64 is prevented positively from abutting on the inner surface 14 of the cylinder, and as a result, an undesirable situation such as galling is avoided.

Figure 14:
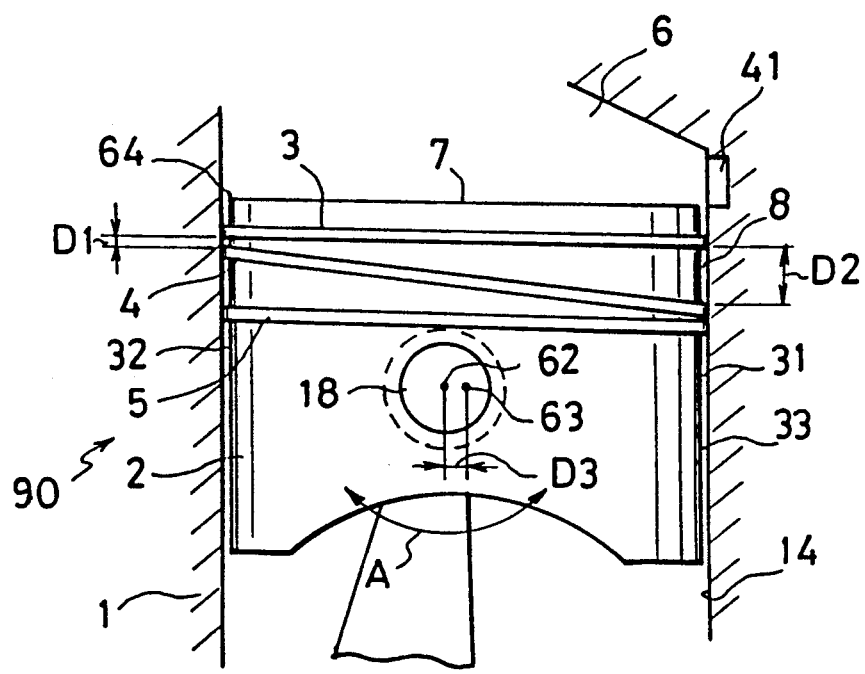
FIG. 14 is a sectional view of a ninth preferred embodiment of the present invention.

While in the engine 80 shown in FIG. 13, the gas passage 15 is the gap between the spaced opposite ends of the piston ring 3, an engine 90 as shown in FIG. 14 like the engines 40 and 50 shown in FIG. 7 and FIG. 5 may be so formed that the opposite ends of the piston 3 are contacted to each other closely and a concavity 41 or 51 is formed as the gas passage on the inner surface 14 of the cylinder 1, and the piston pin 18 is attached eccentrically to the piston 2 in the same way as described above. Here, if the number, shape and position of cocavities 41 or 51 are so selected that the biased space 8 and the engine combustion chamber 6 is communicated to each other with a maximum opening at 10 degrees of crank angle, that they are not communicated at all or are communicated with a minute opening at the top dead center, and that the communication between the biased space 8 and the engine combustion chamber 6 is prevented completely at more than 20 degrees of crank angle, the gas pressure from the engine combustion chamber 6 will be utilized favorably and the piston 2 will be floated satisfactorily from the inner surface 14 of the cylinder 1.

Figure 15:
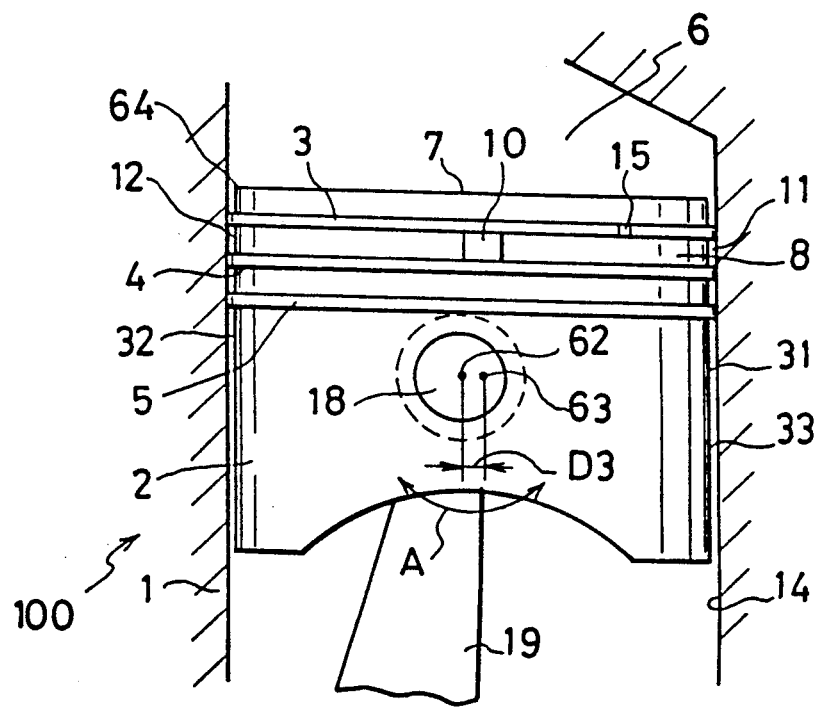
FIG. 15 is a sectional view of a tenth preferred embodiment of the present invention.

While in the engines 60, 70, 80 and 90 described above, any one of the piston rings 3 and 4 is tilted to form the biased space 8, arrangement may be such that as shown in FIG. 15, and as in the engine 20 shown in FIG. 1, the piston rings 3 and 4 are disposed parallel to the upper surface 7, and the partitioning members 9 and 10 that partition the annular space 8 between the piston rings 3 and 4 into two half annular spaces 11 and 12 are disposed between the piston rings 3 and 4 so that a biased space is formed in the annular space 8 between the piston rings 3 and 4 to form the gas chamber, wherein the half annular space 11 is communicated to the engine combustion chamber 6 through the gas passage 15. Therefore, even the engine 100 of the embodiment shown in FIG. 15 operates in the same manner as the engines 60, 70, 80 and 90 described above.

The eccentric value of the piston pin 18 may be selected such that it is capable of canceling satisfactorily the rotation moment of the piston 2 by the gas pressure in the gas chamber. In a preferred embodiment, it is selected from a range of about 0.5 mm to 2.7 mm for 80 mm of the diameter of the piston.

In the engine 60 and the like wherein the piston pin 18 that connects the connecting rod 19 to the piston 2 is provided eccentrically from the center of the piston toward the opposite-to-thrust side, the rotation moment of the piston 2 based on the reactive force from the connecting rod 19 is greater than the opposite rotation moment of the piston 2 by the gas pressure in the gas chamber. Therefore, the oscillation of the piston 2 by the gas pressure in the gas chamber is prevented satisfactorily.

While according to the embodiments of FIGS. 13 to 15, the gas passage 15 is embodied by either the gap between the opposite ends of the piston ring or the concavities, this invention is not limited to these embodiments. The concavity or the through hole may be formed as the gas passage in at least one of the piston 2, piston ring 3 and cylinder 1. In the embodiments having the gas passage, the gas pressure generated by explosion in the engine combustion chamber 8 can be introduced into the gas chamber with appropriate time lag. Thus, the rotation (oscillation) of the piston 2 is further decreased, and the sliding of the piston on the inner surface 14 of the cylinder 1 is decreased satisfactorily.

Another embodiment of the present invention will be described hereinafter with respect to the FIG. 16 and FIG. 17.

Figure 16:
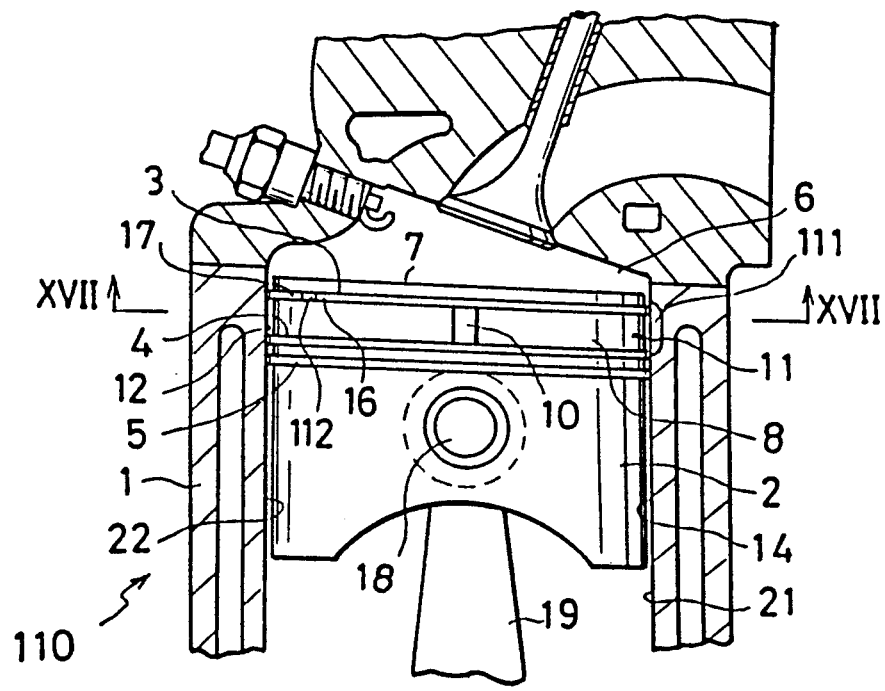
FIG. 16 is a sectional view of an eleventh preferred embodiment of the present invention.
Figure 17:
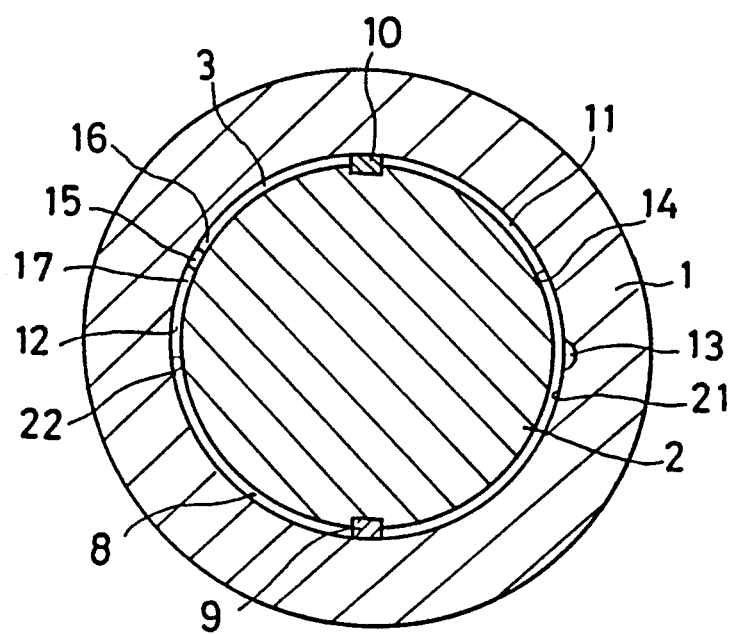
FIG. 17 is a sectional view of embodiment shown in FIG. 16 taken along the line XVII—XVII.

Referring to the FIG. 16 and FIG. 17, the piston rings 3 and 4 of an engine 110 of the present embodiment are disposed with a wider spacing as in the engine 20 than usual therebetween. In the engine 110, a first gas passage 111 that communicates the half annular space 11 on the thrust side to the engine combustion chamber 6 when the piston 2 is in the vicinity of its top dead center is formed on the inner surface 21 of side wall in the form of a hemispherical concavity. The gas passage 111 communicates the half annular space 11 to the engine combustion chamber 6 when the piston 2 is at a position in a range of almost from 0 to 20 degrees of crank angle, and the gas passage 111 communicates the half annular space 11 to the engine combustion chamber 6 with a maximum opening when the piston 2 is at a position of almost 10 degrees of crank angle.

A second gas passage 112 that communicates the half annular space 12 to the engine combustion chamber 6 is embodied by a gap between the opposite ends 16 and 17, spaced wider than usual, of the piston ring 3 in the present embodiment as in the engine 20 or the like. One example of the gap is about 0.6 mm in distance.

Figure 18:
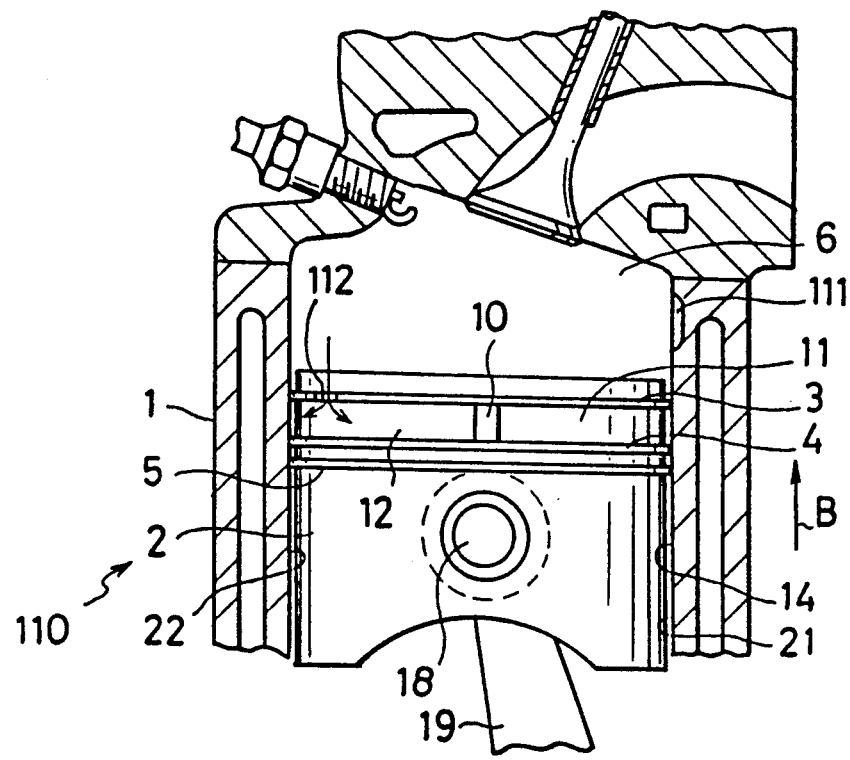
FIGS. 18 and 19 illustrate the operation of the embodiment shown in FIG. 16.

In the engine 110 thus composed, the compressed gas is introduced into the half annular chamber 12 from the engine combustion chamber 6 through the gas passage 112 in the compression stroke wherein the piston 2 is moved upward, i.e. in the direction B, and the connecting rod 19 is on the thrust side, as shown in FIG. 18. The compressed gas introduced into the half annular space 12 on the opposite-to-thrust side acts on the piston 2 so as to push the piston 2 back toward the thrust side, i.e., toward the inner surface 21 of the cylinder on the thrust side against the lateral pressure from the piston 2 to the inner surface 22 of the cylinder on the opposite-to-thrust side through the piston rings 3, 4 and the oil ring 5. Thus, in the compression stroke the piston 2 is moved in the direction B in a state where the lateral pressure exerted from the piston 2 to the inner surface 22 of the cylinder on the opposite-to-thrust side through the piston rings 3, 4 and the oil ring 5 is canceled so that the sliding frictional resistance of the piston 2 to the inner surface 22 of the cylinder on the opposite-to-thrust is decreased enough. In the compression stroke, when the piston 2 is at a position in a range of almost from 0 to 20 degrees of crank angle, the engine combustion chamber 6 and the half annular space 11 are communicated to each other by the gas passage 111, so that the compressed gas is also introduced into the half annular space 11. However, that introduction does not greatly affect a decrease in the sliding frictional resistance to the inner surface 22 of the cylinder on the opposite-to-thrust side because the compressed gas is introduced into the space 11 through the gas passage 111 later than through the gas passage 112.

Figure 19:
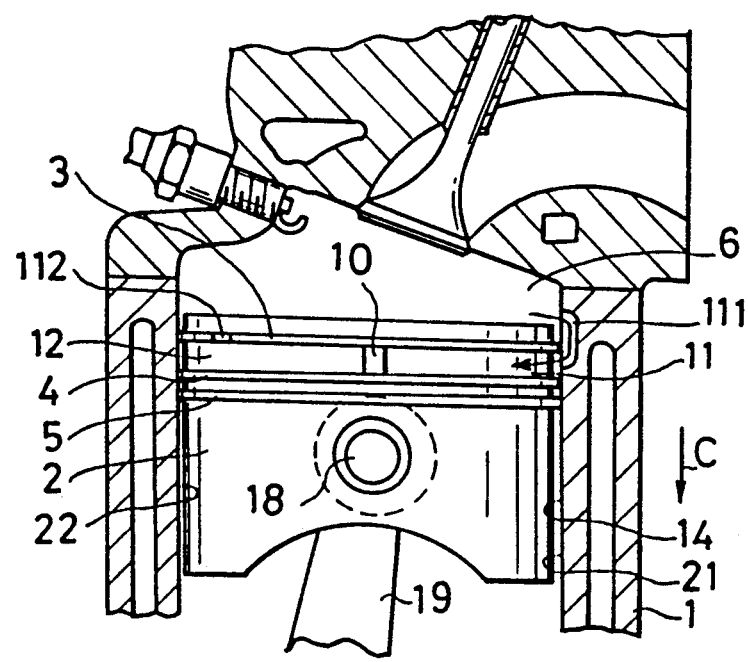

On the other hand, in the explosion stroke where the piston 2 is moved downward, i.e. in the direction C and the connecting rod 19 is on the opposite-to-thrust side, as shown in FIG. 19, and in more detail, while the piston 2 is at a position a range of almost from 0 to 20 degrees of crank angle after the explosion of the compressed gas in the engine combustion chamber 6, a high pressure combustion gas is introduced into the half annular space 11 mainly through the gas passage 111. The high pressure combustion gas introduced into the half annular space 11 on the thrust side acts on the piston 2 so as to push the piston 2 back toward the opposite-to-thrust side, i.e., toward the inner surface 22 of the cylinder on the opposite-to-thrust side against the lateral pressure from the piston 2 to the inner surface 21 of the cylinder on the thrust side through the piston rings 3, 4 and the oil ring 5. Consequently, the piston 2 is moved in the direction C in a state where the lateral pressure from the piston 2 to the inner surface 21 of the cylinder on the thrust side through the piston rings 3, 4 and the oil ring 5 in the explosion stroke is canceled so that the sliding frictional resistance of the piston 2 to the inner surface 21 of the cylinder on the thrust side is decreased enough. Since the communication of the engine combustion chamber 6 to the half annular space 11 through the gas passage 111 is interrupted when the piston 2 is moved to a position of more than 20 degrees of crank angle, the high pressure combustion gas introduced into the half annular space 11 is maintained as it is in some degree to thereby act on the piston 2 so as to push it back toward the inner surface 22 of the cylinder on the opposite-to-thrust side, and, consequently, the sliding friction resistance of the piston 2 to the inner surface 21 of the cylinder on the thrust side is decreased. While in the explosion stroke, high pressure combustion gas is also introduced into the half annular space 12 from the engine combustion chamber 6 through the gas passage 112, the above operation is performed positively because the diameters of the gas passages 111 and 112 are so set that the amount of high pressure combustion gas introduced into the half annular space 11 through the gas passage 111 is more than the amount of high pressure combustion gas introduced into the half annular space 12 through the gas passage 112.

According to the engine 110 as described above, the piston 2 can be subjected into the air-floated state from the inner surface of the cylinder in any strokes, and as a result, the piston 2 can be reciprocated with the reduced sliding frictional resistance to the inner surface 14 of the cylinder.

When the opposite ends of the piston ring 3 are disposed with a spacing there between to embody the gas passage 112, for example, either protuberances or concavities may be formed on the inside circumferential surface or the like of the piston ring 3, and concavities or protuberances that engage protuberances or concavities on the piston ring 2 may be formed on the groove for receiving the piston ring of the piston 2, so that the piston ring 3 is fixed to the piston 2, in order to prevent the rotation of the piston ring 3 around the piston 2 as well as to dispose at all times the spacing between the opposite ends of the piston ring 3 at the position where the half annular space 12 on the opposite-to-thrust side is communicated to the engine combustion chamber 6 through the spacing during the operation of the engine.

I claim:

1. An engine comprising a piston; a top ring and a second ring which are fitted on a piston; a partition member fitted on the piston and connecting the top ring and the second ring for forming a gas chamber at a side surface of the piston; and a gas passage for communicating the gas chamber to an upper surface of the piston, wherein the gas passage is a gap between opposite ends of the top ring.

2. An engine comprising a first and a second piston ring provided on a piston, and a gas passage formed at a position of the first piston ring for adjusting a gas flow, the first piston ring being disposed adjacent to an upper surface of the piston that defines an engine combustion chamber, the gas passage communicating between the engine combustion chamber and an annular gas chamber defined between a side surface of the piston and an inner surface of a side wall of a cylinder opposite to the side surface of the piston as well as between the first piston ring and the second piston ring, the second piston ring being disposed adjacent to the first piston ring, the first and second piston rings being so provided on the piston that a distance between the first and second piston rings increases gradually from one of oscillating side surfaces of the piston to other oscillating side surface opposite to the one oscillating side surface.

3. An engine as claimed in claim 2, wherein the first piston ring is disposed on an outer circumferential surface of the piston substantially parallel to the upper surface of the piston which defines the engine combustion chamber; and the second piston ring is disposed on the outer circumferential surface of the piston and tilted toward the first piston ring.

4. An engine as claimed in claim 2, wherein the gas passage is a gap between spaced opposite ends of the first piston ring.

5. An engine as claimed in claim 2, wherein the gas passage is a concavity provided on the first piston ring.

6. An engine as claimed in claim 2, wherein one of the oscillating side surfaces of the piston is on an opposite-to-thrust side and the other of the oscillating side surfaces is on a thrust side.

7. An engine comprising a first and a second piston ring provided on a piston, and a gas passage formed at a position of the first piston ring for adjusting a gas flow, the first piston ring being disposed adjacent to an upper surface of the piston that defines an engine combustion chamber, the gas passage communicating between the engine combustion chamber and an annular gas chamber defined between a side surface of the piston and an inner surface of a side wall of a cylinder opposite to the side surface of the piston as well as between the first piston ring and a second piston ring, the second piston ring being disposed adjacent to the first piston ring, the first and second piston rings being so provided on the piston that an area of the piston side surface which receives a gas pressure in the annular gas chamber increases from one of oscillating side surfaces of the piston to other oscillating side surface opposite to the one oscillating side surface.

8. An engine comprising a biased space into which a gas pressure from an engine combustion chamber is introduced, the biased space being formed between an inner surface of a side wall of a cylinder and a side surface of a piston opposite to the inner surface of the side wall of the cylinder such that an area of the side surface of the piston which receives the gas pressure is larger at the side surface of the piston on a thrust side than at the side surface of the piston on an opposite-to-thrust side, and a piston pin for connecting a connecting rod to the piston, the pin being provided on the piston such that a center of the pin is displaced from a center of the piston toward the opposite-to-thrust side.

9. An engine comprising a piston ring provided at a side surface of a piston adjacent to an upper surface of the piston such that a distance from an upper surface of the piston which defines an engine combustion chamber to the piston ring increases gradually from a side surface of the piston on an opposite-to-thrust side toward the side surface of the piston on a thrust side and a piston pin for connecting a connecting rod to the piston, the pin being provided on the piston such that a center of the pin is displaced from a center of the piston toward the opposite-to-thrust side.

10. An engine as claim 9, wherein the piston ring is provided on the side surface of the piston and tilted toward an upper surface of the piston.

11. An engine as claimed in claim 9, comprising a second piston ring provided adjacent and parallel to the piston ring on the side surface of the piston.

12. An engine as claimed in claim 9, comprising a second piston ring provided adjacent to the first-mentioned piston ring and parallel to an upper surface of the piston on the side surface of the piston.

13. An engine comprising a piston ring provided at a side surface of a piston such that an area of the side surface of the piston which receives a gas pressure from a engine combustion chamber is larger at the side surface of the piston on a thrust side than at the side surface of the piston on an opposite-to-thrust side, and a piston pin for connecting a connecting rod to the piston, the pin being provided at the piston such that a center of the pin is displaced from a center of the piston toward the opposite-to-thrust side.

14. An engine comprising a gas passage for communicating between an engine combustion chamber and an annular gas chamber defined between a side surface of a piston and an inner surface of a side wall of a cylinder opposite to the side surface of the piston, and between a first and a second piston ring provided on the piston, the first piston ring being disposed adjacent to an upper surface of the piston which defines the engine combustion chamber and the second piston ring being disposed adjacent to the first piston ring, the first and second piston rings so provided on the piston that a distance between the first and second piston rings increases gradually from the side surface of the piston on an opposite-to-thrust side toward the side surface of the piston on a thrust side; and a piston pin for connecting a connecting rod to the piston, the pin being provided on the piston such that a center of the pin is displaced from a center of the piston toward the opposite-to-thrust side.

15. An engine as claimed in claim 14, wherein the first piston ring is disposed on an outer circumferential surface of the piston substantially parallel to an upper surface of the piston which defines the engine combustion chamber; and the second piston ring is disposed on the outer circumferential surface of the piston and tilted toward the first piston ring.

16. An engine as claimed in claim 14, wherein the first and second piston rings are disposed on an outer circumferential surface of the piston substantially parallel to an upper surface of the piston which defines the engine combustion chamber; and comprising a partition member provided between the first and second piston rings for defining the gas chamber.

17. An engine as claimed in claim 14, wherein the gas passage is a gap between spaced opposite ends of the first piston ring.

18. An engine as claimed in claim 14, wherein the gas passage is one of a through hole and a concavity formed in one of the piston, the first piston ring and the cylinder.

19. An engine comprising a gas chamber communicated to an engine combustion chamber through a gas passage, the gas chamber being provided between a side surface of a piston and an inner surface of a side wall of a cylinder opposite to the side surface of the piston and between a first piston ring disposed adjacent to an upper surface of the piston that defines the engine combustion chamber and a second piston ring disposed adjacent to the first piston ring such that an area of the side surface of the piston which receives a gas pressure is larger at the side surface of the piston on a thrust side than at the side surface of the piston on an opposite-to-thrust side; and a piston pin for connecting a connecting rod to the piston, the pin being provided on the piston such that a center of the pin is displaced from a center of the piston toward the opposite-to-thrust side.

20. An engine comprising an annular space defined as a biased gas chamber between a side surface of a piston and an inner surface of a side wall of a cylinder opposite to the side surface of the piston and between a first piston ring disposed adjacent to an upper surface of the piston that defines an engine combustion chamber and a second piston ring disposed adjacent to the first piston ring such that an area of the side surface of the piston that receives a gas pressure in the biased gas chamber is larger at the side surface of the piston on a thrust side than at the side surface of the piston on an opposite-to-thrust side; and a gas passage provided on the inner surface of the side wall of the cylinder for communicating the biased gas chamber to the engine combustion chamber when the piston is at a position substantially in a range from 0 to 20 degrees of crank angle.

21. An engine comprising a piston provided with a first piston ring disposed adjacent to an upper surface of the piston which defines an engine combustion chamber, and a second piston ring disposed adjacent to the first piston ring such that a distance between the first and second piston rings increases gradually from a side surface of the piston on an opposite-to-thrust side toward the side surface of the piston on a thrust side; and a cylinder formed on an inner surface of a side wall thereof with a gas passage for communicating to the engine combustion chamber an annular biased gas chamber defined between the side surface of the piston and the inner surface of the side wall of the cylinder opposite to the side surface of the piston as well as between the first piston ring and the second piston ring, when the piston is at a position substantially in a range from 0 to 20 degrees of crank angle.

22. An engine as claimed in claim 21, wherein the first piston ring is disposed on an outer circumferential surface of the piston substantially parallel to an upper surface of the piston that defines the engine combustion chamber; and the second piston ring is disposed on the outer circumferential surface of the piston and tilted toward the first piston ring.

23. An engine as claimed in claim 21, wherein the gas passage is formed on the inner surface of the side wall of the cylinder so as to communicate the biased gas chamber to the engine combustion chamber with a maximum opening when the piston is at a position corresponding substantially to 10 degrees of crank angle.

24. An engine as claimed in claim 21, wherein the gas passage is formed on the inner surface of the side wall of the cylinder so as to close the communication of the biased gas chamber to the engine combustion chamber or to slightly communicate the biased gas chamber to the engine combustion chamber when the piston is at a position corresponding substantially to 0 degree of crank angle.

25. An engine as claimed in claim 21, wherein the gas passage is formed on the inner surface of the side wall of the cylinder opposite to the side surface of the piston on the thrust side.

26. An engine as claimed in claim 21, wherein the gas passage is formed on the inner surface of the side wall of the cylinder so as to close communication between the biased gas chamber and the engine combustion chamber when the piston is at a position substantially more than 20 degrees of crank angle.

27. An engine as claimed in claim 21, wherein the gas passage is a spherical concavity formed on the inner surface of the side wall of the cylinder.

28. An engine comprising an annular space formed between a first piston ring disposed adjacent to an upper surface of a piston that defines an engine combustion chamber and a second piston ring disposed adjacent to the first piston ring, the annular space being partitioned into a half annular space on a thrust side and a half annular space on an opposite-to-thrust side; a first gas passage formed on a side wall of a cylinder for communicating the half annular space on the thrust side to the engine combustion chamber when the piston is in the vicinity of the top dead center; and a second gas passage for communicating the half annular space on the opposite-to-thrust side to the engine combustion chamber.

29. An engine as claimed in claim 28, wherein the first gas passage is formed on an inner surface of the side wall of the cylinder so as to communicate the half annular space on the thrust side to the engine combustion chamber when the piston is at a position substantially in a range from 0 to 20 degrees of crank angle.

30. An engine as claimed in claim 28, wherein the first gas passage is formed on an inner surface of the side wall of the cylinder so as to communicate the half annular space on the thrust side to the engine combustion chamber with a maximum opening when the piston is at a position of substantially 10 degrees of crank angle.

31. An engine as claimed in claim 28, wherein the first gas passage is a spherical concavity formed on an inner surface of the side wall of the cylinder.

32. An engine as claimed in claim 28, wherein the second gas passage is formed in the piston.

33. An engine as claimed in claim 28, wherein the second gas passage is formed on the first piston ring.

34. An engine as claimed in claim 28, wherein the second gas passage is disposed between opposing ends of the first piston ring.

* * * * *